United States Patent [19]

Chen, Sr. et al.

[11] Patent Number: 5,182,334
[45] Date of Patent: Jan. 26, 1993

[54] COMPATIBLE LCP BLENDS VIA DIRECT ESTERIFICATION

[75] Inventors: Paul Chen, Sr., Gillett; Vincent Sullivan, Madison; Thomas Dolce, Stirling; Mike Jaffe, Maplewood, all of N.J.

[73] Assignee: Hoechst Celanese Corp., Somerville, N.J.

[21] Appl. No.: 679,894

[22] Filed: Apr. 3, 1991

[51] Int. Cl.$^5$ .................. C08L 67/02; C08L 71/12
[52] U.S. Cl. ........................ 525/397; 525/905
[58] Field of Search .................. 525/397, 905

[56] References Cited

U.S. PATENT DOCUMENTS

| | | | |
|---|---|---|---|
| 4,403,057 | 9/1983 | Yamashita et al. | 560/108 |
| 4,855,484 | 8/1989 | Müller et al. | 560/72 |
| 4,906,693 | 3/1990 | Craun et al. | 525/440 |

FOREIGN PATENT DOCUMENTS

| | | | |
|---|---|---|---|
| 3505142 | 8/1986 | Fed. Rep. of Germany | 525/397 |
| 8800605 | 1/1988 | World Int. Prop. O. | 525/397 |

*Primary Examiner*—James J. Seidleck
*Assistant Examiner*—Thomas Hamilton, III
*Attorney, Agent, or Firm*—James M. Hunter, Jr.

[57] ABSTRACT

A process for making a compatible LCP blend by reactively esterifying an LCP having a carboxylic acid or ester end group with either PPO or PPS, or derivatives thereof, using a catalytic mixture containing boric acid and polyphosphoric acid or sulfuric acid. The carboxylic functionality on the LCP reacts with the hydroxyl end group on the PPO or the thiol end group on the PPS to form an ester or thioester linkage. The two polymers to be blended are melt mixed with the catalyst mixture and extruded.

12 Claims, No Drawings

COMPATIBLE LCP BLENDS VIA DIRECT ESTERIFICATION

BACKGROUND OF THE INVENTION

The present invention relates to a process for making liquid crystal polymer ("LCP") blends, especially to a process for making compatible LCP/PPO and LCP/PPS blends.

Many polymers exhibiting liquid crystalline properties are known in the art. However, these polymers generally tend to be incompatible with other polymers. When a compatible blend of an LCP and another polymer is desired, it is often necessary to add a small amount of another ingredient or compatibilizer to promote more thorough blending between the two polymers. The additional ingredient may work by promoting bond formation between diverse polymer molecules. However, a compatibilizer that is effective in one system may not be effective in others; a great deal depends upon the specific functionalities of the molecules.

An important driving force in seeking new polymer blends is cost-effectiveness. It is often desirable, for example, to discover new blends that have one or more desirable characteristics found in an expensive polymer, but cost less. This is usually accomplished by finding a suitable blend comprising the expensive polymer and a less expensive one.

Another reason for blending polymers is to create compositions that are better able to meet special needs than the polymers known in the art. Accordingly, it is sometimes desired to combine an LCP with another polymer having special characteristics in the hope of creating a blend exhibiting the desirable characteristics of both polymers. For example, polyphenylenesulfide ("PPS") has very good thermal stability and chemical resistance, potentially important characteristics for an LCP blend. Polyphenyleneoxide ("PPO") exhibits reasonable impact resistance. However, LCP's are generally incompatible with PPO or PPS. LCP/PPO and LCP/PPS blends tend to have large regions or domains of the individual polymers rather than fine, well-dispersed domains; the large domains tend to produce poor properties, e.g. films having poor tensile properties.

It is known that phenols may be directly esterified using a combination of boric acid and either sulfuric acid or polyphosphoric acid as a catalyst. This process is described by Lowrance in "Boric Acid-Catalyzed Esterification Of Phenols", *Tetrahedron Letters*, No. 37, pp. 3453–4 (1971). However, this process has not been applied to polymers.

SUMMARY OF THE INVENTION

The present invention is a process in which an LCP having a carboxylic acid or ester end group is reactively compatibilized with either PPO or PPS, or derivatives thereof, using a mixture comprising boric acid and polyphosphoric acid or sulfuric acid as a catalyst. The carboxylic functionality on the LCP thus may react with the hydroxyl end group on the PPO or the thiol end group on the PPS to form an ester or thioester linkage. In the process of this invention the two polymers to be blended are melt mixed with the catalyst mixture and extruded.

It is an object of this invention to provide a process for forming compatible LCP mixtures.

It is also an object of this invention to provide a process for reactively compatibilizing an LCP with PPO or PPS.

It is a further object of this invention to provide improved LCP blends.

It is another object of this invention to provide a process for the direct esterification of hydroxyl- or thiol-containing polymers by carboxyl-containing LCP's.

Other objects and purposes of the present invention will be apparent to those skilled in the art upon consideration of the following disclosure.

DETAILED DESCRIPTION OF THE PREFERRED EMBODIMENTS

In a preferred embodiment of the present invention, either PPO or PPS is combined with an LCP having carboxylic acid end groups, e.g. Vectra ® (Hoechst Celanese Corporation), in weight proportions of between about 90:1 and about 10:90. To this combination is added a catalyst mixture containing approximately 0.1–2.0% by weight of boric acid and 0.1–1.0% by weight of polyphosphoric acid and/or sulfuric acid; preferably, the weight percent boric acid is about twice that of the other acid(s). These components are all blended together in a melt mixer at a temperature suitable for making the polymers flow, e.g. about 280°–320° C.; a temperature in the approximate range of 280°–300° C. may be sufficient. This polymer blend then is processed into any desired form, e.g., as a film, fiber, or molded article, by conventional means.

The melt mixing should proceed until the esterification is essentially complete and the polymers are well-blended. The exact amount of time needed will depend on many factors, including the nature, ratio, amount and molecular weight of the polymers, the temperature, the rate of mixing, and so forth. Typically, at least about 2–20 minutes is required.

Those skilled in the art will have no difficulty optimizing the amount of catalyst needed for a given polymer blend. Several factors are believed to affect the amount of catalyst needed. One factor is the molecular weight of the polymer molecules: since the compatibilization is accomplished via end group reactions, less catalyst is indicated where less end groups exist, i.e. for larger molecules.

A second factor is the polymer ratio: a 50:50 mixture normally requires a maximal amount of catalyst since more compatibilization is needed than for other ratios. In a 90:10 or 10:90 mixture, for instance, the catalyst need only cause the minor polymer constituent to react with about 10 parts of the 90-part polymer constituent so only a minimal amount of catalyst is indicated. For intermediate ratios, e.g. 30:70 or 70:30, intermediate amounts of catalyst are expected to be needed.

Other factors will also play a role in determining the optimal catalyst percentage, including the temperature and the amount of time used for melt blending the components, and the exact nature of the polymers.

Since this process is a direct esterification reaction, it is preferable to blend (1) an LCP having a —COOH end group with (2) PPO, PPS, or a derivative of PPO or PPS, component (2) having either an —OH or an —SH end group. However, the reaction may also proceed where the LCP comprises a carboxylic ester end group provided the catalyst acids are able to cleave the ester so that the carboxyl group may form an ester linkage with the other polymer. Similarly, some derivatives of PPO or PPS having ester or thioester linkages, or the like, that may be cleaved by the catalyst acids may also be used in the practice of this invention, e.g. end-capped PPO or PPS. Those skilled in the art will be able to determine, without undue experimentation, which polymers may be used in the practice of this invention.

The following Examples are provided to further illustrate particular embodiments of the present invention; however, the invention is not to be construed as limited to the embodiments illustrated.

EXAMPLE I

The following ingredients were melt blended in a HAAKE mixer at 290° C. and 100 rpm for 10 minutes:
  35 grams PPO
  35 grams Vectra ® A910 (Hoechst Celanese Corp.)
  1.4 gram boric acid
  0.7 gram polyphosphoric acid.

This blend was then ground and made into a film by conventional means. A second film was made in the same way except that Fortron ® PPS was used instead of PPO.

EXAMPLE II

The PPO-containing polymer film made in Example I was compared to a virgin PPO film, and to a control film made from a 50:50 blend of PPO and Vectra ® without the catalyst mixture.

PPO is known to dissolve in methylene chloride (dichloromethane), which solvent was used in an extraction test. Each film was subjected to 12 hours of Soxhlet extraction by methylene chloride.

The virgin PPO film was 96% extracted/solubilized by this solvent. For the control film, 23% of the mass of the film was extracted. The LCP/PPO film made in Example I according to the present invention only lost 3% of its mass to the solvent, indicating that the catalyst caused the vast majority of PPO molecules to bond to the LCP so that the PPO was no longer extractable. The latter blend is clearly much more solvent resistant than is either virgin PPO or LCP/PPO blends prepared without the catalyst mixture of this invention. These results provide strong evidence of the specific molecular level interactions that are believed to occur in the process of this invention.

The control film and the acid-compatibilized film were also compared on the basis of other properties, and these results are summarized below:

| LCP/PPO Film | IV | T/E/M (flow direction) | T/E/M (transverse direction) |
|---|---|---|---|
| Control Film | 3.40 | 10.2/3.4/.47 | 3.5/1.1/.33 |
| Acid-compatibilized Film | 3.42 | 8.7/3.5/.44 | 2.2/.85/.31 |

IV = intrinsic viscosity
T = tensile strength (Ksi)
E = elongation (%)
M = modulus (Msi)

The tensile properties of the control film are similar to those of the film prepared from the compatibilized blend according to the present invention. The differences between the properties in the flow direction and those in the transverse direction result from the expected anisotropy of these LCP blends.

EXAMPLE III

The PPS-containing polymer film made in Example I was compared to a control film made from a 50:50 blend of PPS and Vectra ® A910 without using the catalyst mixture to compatibilize the polymers.

PPS is known to dissolve in 2-chloronaphthalene at elevated temperatures. Each film was treated with this solvent at 210° C.; the control film broke into pieces after 15 minutes, but the acid-compatibilized blend film retained its physical integrity for 4 hours. These results provide strong evidence of the molecular interactions that are believed to occur due to the acid compatibilization of the polymer blend.

The control film and the acid-compatibilized film were also compared on the basis of other properties, and these results are summarized below:

| | T/E/M in the Flow direction | T/E/M in the Transverse direction |
|---|---|---|
| Control Film | 9.0/2.9/.47 | 2.8/.86/.35 |
| Acid-compatibilized Film | 7.7/2.5/.50 | 3.6/2.0/.33 |

T = tensile strength (Ksi)
E = elongation (%)
M = modulus (Msi)

The compatibilized polymer blend film has significantly better transverse properties than the control film; specifically, the elongation is more than double and the tensile strength is much higher than that of the control film.

EXAMPLE IV

A range of mixtures of Fortron ® PPS and Vectra ® A 910 LCP, including both untreated mixtures and mixtures treated with a catalyst according to the present invention, were melt mixed at 300° C. and 100 rpm for 10 minutes. The treated mixtures were melt mixed with 1.4% boric acid and 0.7% polyphosphoric acid. These various blends were turned into films and the films were treated with 2-chloronaphthalene 210° C. The pertinent data is presented below:

| Wt Ratio LCP/PPS | Solvent Effects |
|---|---|
| Untreated: | |
| 75/25 | Good integrity after >4 hours |
| 50/50 | Film broke after 30 minutes |
| 25/75 | Film broke after 20 minutes |
| Treated: | |
| 75/25 | Good integrity after >4 hours |
| 50/50 | Good integrity after 4 hours |
| 25/75 | Film broke after 2 hours |

EXAMPLE V

A range of mixtures of Fortron ® PPS and Vectra ® A 910 LCP, including both untreated mixtures and mixtures treated with a catalyst according to the present invention, were melt mixed at 290° C. and 100 rpm for 10 minutes. The treated mixtures were melt mixed with 1.4% boric acid and 0.7% polyphosphoric acid. Films were made from these blends, and from pure PPS and LCP, for the purpose of measuring and comparing tensile properties; the results are presented below:

| Wt Ratio LCP/PPS | T/E/M in the Flow direction | T/E/M in the Transverse direction |
|---|---|---|
| Untreated: | | |
| 0/100 | 8.036/3.02/0.328 | 8.119/3.20/0.331 |
| 0/100 | 8.898/3.49/0.357 | 7.860/3.09/0.310 |

-continued

| Wt Ratio LCP/PPS | T/E/M in the Flow direction | T/E/M in the Transverse direction |
|---|---|---|
| 25/75 | 9.305/3.57/0.382 | 7.183/2.31/0.366 |
| 25/75 | 9.206/3.49/0.372 | 7.194/2.25/0.368 |
| 50/50 | 8.996/2.87/0.467 | 2.822/0.86/0.350 |
| 75/25 | 12.502/6.04/0.543 | 5.127/1.94/0.325 |
| 75/25 | 12.921/6.30/0.559 | 5.099/1.87/0.323 |
| 100/0 | 23.790/9.72/0.730 | 7.613/17.3/0.296 |
| Treated: | | |
| 0/100 | 8.945/3.78/0.367 | 8.383/2.90/0.375 |
| 0/100 | 7.833/3.03/0.327 | 8.072/3.18/0.335 |
| 25/75 | 6.455/2.01/0.368 | 5.791/1.78/0.373 |
| 25/75 | 5.480/1.87/0.334 | 5.457/1.77/0.346 |
| 50/50 | 7.708/2.54/0.449 | 3.680/1.20/0.324 |
| 75/25 | 14.655/9.84/0.545 | 3.723/1.40/0.315 |
| 75/25 | 13.359/7.58/0.542 | 3.698/1.35/0.313 |
| 100/0 | 17.735/6.38/0.696 | 7.373/8.15/0.304 |

T = tensile strength (Ksi)
E = elongation (%)
M = modulus (Msi)

In the preceding Examples, no attempt was made to optimize the amount of the catalyst acids for each polymer ratio. It is possible that improved results may be obtained once such optimization is achieved. Nevertheless, the blends all appeared to be successfully compatibilized using the amount of catalyst mixture indicated in each Example.

Many variations of the process and of the polymer blends disclosed herein will be apparent to those skilled in the art. The present invention is not limited to the embodiments described and illustrated herein, but encompasses all the subject matter within the appended claims.

We claim:

1. A process for making a compatible liquid crystal polymer blend comprising the steps of:
   (a) combining a liquid crystal polymer having a carboxylic acid or an ester end group, a second polymer, boric acid, and a strong acid chosen from the group consisting of polyphosphoric acid, sulfuric acid, and mixtures thereof; and,
   (b) melt mixing said combined polymers and acids at a temperature sufficient to cause said polymers to flow, said mixing promoting a direct esterification reaction between said liquid crystal polymer and said second polymer,
wherein said second polymer comprises a polymer chosen from the group consisting of:
   a polyphenyleneoxide having a hydroxyl end group or end-capped with an ester linkage that will cleave during said combining or mixing steps; and
   a polyphenylenesulfide having a thiol group or end-capped with a thioester group that will cleave during said combining or mixing steps.

2. A process according to claim 1 wherein said polymers are combined in a weight ratio of between about 1 and about 1:9.

3. A process according to claim 2 wherein said boric acid comprises between about 0.1% and about 2.0% of the total weight of said blend and said strong acid comprises between about 0.1% and 1.0% of the total weight of said blend.

4. A process according to claim 2 wherein the ratio of said boric acid to said strong acid is approximately 2:1.

5. A polymer blend made according to the process of claim 2.

6. A process according to claim 1 wherein said temperature is in the approximate range of 280°-320° C.

7. A process according to claim 1 wherein said temperature is in the approximate range of 280°-300° C.

8. A process for making a compatible solvent-resistant blend of a liquid crystal polymer having a carboxylic acid end group and a second polymer selected from the group consisting of polyphenyleneoxide and polyphenylenesulfide comprising the steps of:
   forming a mixture that comprises: said liquid crystal polymer; said second polymer; boric acid; and, a strong acid chosen from the group consisting of polyphosphoric acid, sulfuric acid, and mixtures thereof; and,
   melt mixing said mixture at a temperature of approximately 280°-320° C.,
wherein said polymers are present in a ratio of between about 9:1 and about 1:9, wherein said boric acid comprises about 0.1-2.0% of the total weight of said blend, and further wherein said strong acid comprises between about 0.1% and 1.0% of the total weight of said blend.

9. A process according to claim 8 wherein said melt blending proceeds for at least 2-20 minutes.

10. A polymer blend made according to the process of claim 8.

11. A polymer blend comprising a liquid crystal polymer, a second polymer, boric acid, and a strong acid chosen from the group consisting of polyphosphoric acid, sulfuric acid, and mixtures thereof, wherein said liquid crystal polymer comprises a carboxyl end group and said second polymer comprises an end group selected from the class consisting of hydroxyl and thiol.

12. A polymer blend according to claim 11 wherein said polymers have been reactively compatibilized by an esterification reaction between said carboxyl end group and said end group of said second polymer.

* * * * *